Aug. 8, 1939.  F. D. KORKOSZ ET AL  2,168,799
PROJECTION APPARATUS
Filed July 20, 1937    4 Sheets-Sheet 1

INVENTOR.
Frank D. Korkosz and
BY  John J. Korkosz
        ATTORNEY.

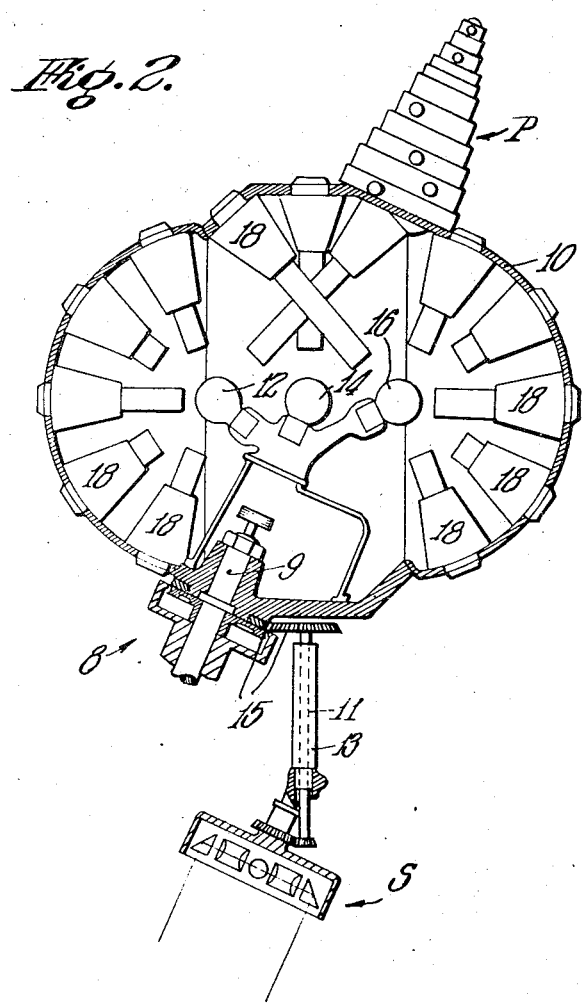

Aug. 8, 1939.   F. D. KORKOSZ ET AL   2,168,799
PROJECTION APPARATUS
Filed July 20, 1937   4 Sheets-Sheet 3

INVENTOR.
Frank D. Korkosz and
BY John J. Korkosz
ATTORNEY.

Aug. 8, 1939.   F. D. KORKOSZ ET AL   2,168,799
PROJECTION APPARATUS
Filed July 20, 1937   4 Sheets-Sheet 4

INVENTOR.
Frank D. Korkosz
John J. Korkosz
BY
Walter C. Ross
ATTORNEY.

Patented Aug. 8, 1939

2,168,799

UNITED STATES PATENT OFFICE 2,168,799

PROJECTION APPARATUS

Frank D. Korkosz and John J. Korkosz,
Chicopee, Mass.

Application July 20, 1937, Serial No. 154,590

8 Claims. (Cl. 88—24)

This invention relates to improvements in projection apparatus and is directed more particularly to improvements in apparatus for projecting spots of light onto a screen or projection surface, to represent the celestial bodies such as stars and the like.

According to special features of the invention, the apparatus includes a plurality of sources of light and a plurality of lenses. The sources of light may be of different intensity and the lenses may be of different focal lengths and angles of projection and have apertured disks or masks associated therewith to pass light and so arranged that areas projected on the screen by the lenses have portions thereof in overlapping relation. This makes it possible to project spots of light from one lens onto an area covered by another and the masks may have apertures of different sizes whereby it is possible to project onto the screen a multitude of spots of light in such relative positions, relative sizes and intensity as is an accurate simulation of the stars and celestial bodies as observed in any certain section of the heavens.

According to another novel feature, there is provided a projecting surface or screen generally in the form of an inverted screen, or inverted dome, the central upper portion of which has a certain curvature while the side portions leading therefrom are of greater curvature and the lower portions merge into a circumferential part which is substantially vertically disposed. This makes it possible as the projection apparatus operates and is in motion to project light spots on the lower part of the screen which appear to be larger than when the same spots are projected on the upper part. This simulates the effect corresponding to that when observing bodies near the horizon. That is, the novel form of the screen is such that those bodies projected on the screen near the horizon appear to be larger than when projected thereabove just as they appear to an observer. The vertical part of the screen may be decorated to simulate the sky line all of which lends realism to the effect produced by means of the apparatus.

Various other novel features and advantages of the invention will be more fully hereinafter observed in connection with the following description of the present preferred form thereof, reference being had to the accompanying drawings, wherein:

Fig. 2 is a sectional view through the hollow lens support of the apparatus shown in Fig. 1;

Figure 1:
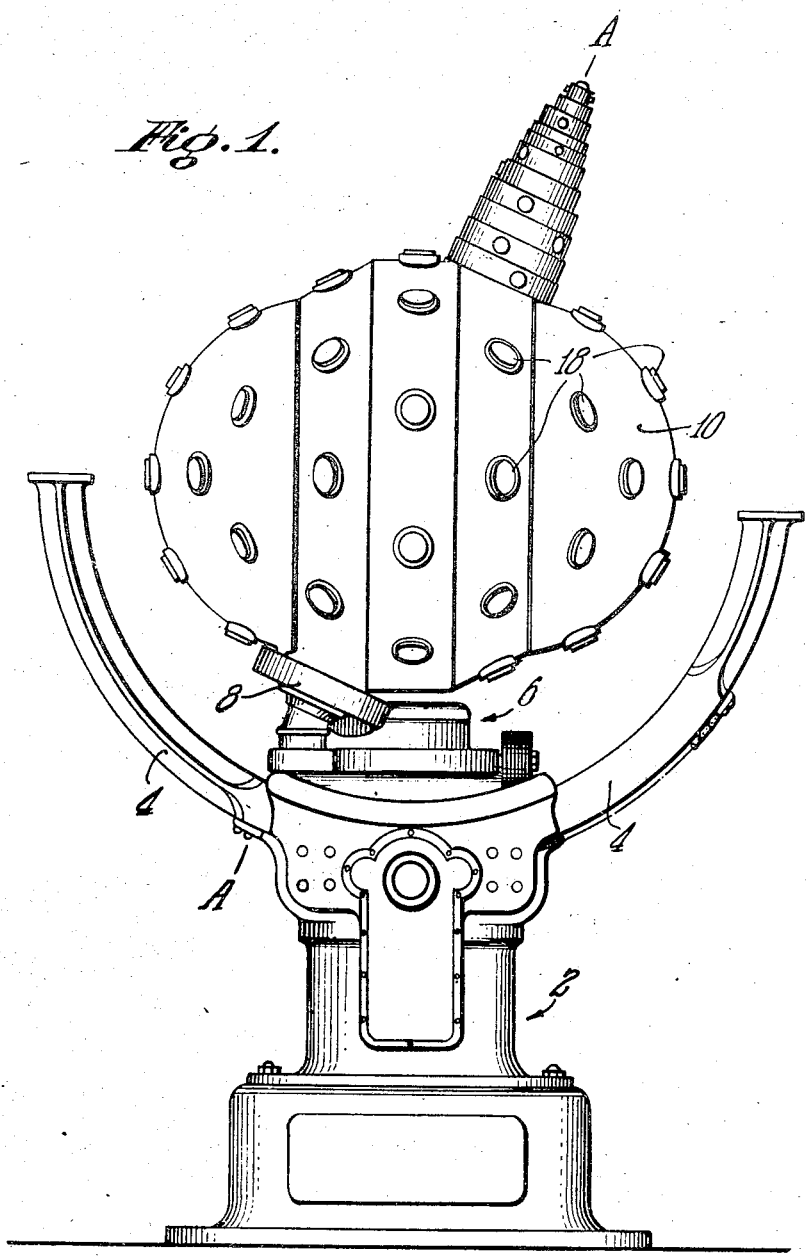
Fig. 1 is a side elevational view of a projection apparatus embodying the novel features of the invention.

Referring now to the drawings in detail, the invention will be fully described.

A base, represented at 2, may be of any desired form and has certain operating mechanisms associated therewith. A curved track 4 extends upwardly and outwardly from either side thereof and a carriage, represented at 6, may include certain operating mechanisms and move along the track. A casing 8 carries mechanism for a rotating shaft 9 fixed to a lens support 10 in the form of a hollow shell so that the shell rotates on an axis A—A which may be called the eclyptic axis. A shaft 11 rotating in a bearing 13 is geared by gears 15 to the casing so that the casing may rotate on the axis of said shaft which may be called the equatorial axis. In this way the lens support rotates on the two axes and siultaneously if desired. The carriage 6 being slidable along the track 4, the lens support may assume various positions and rotate or oscillate with its axes in any desired angular position.

Figure 4:
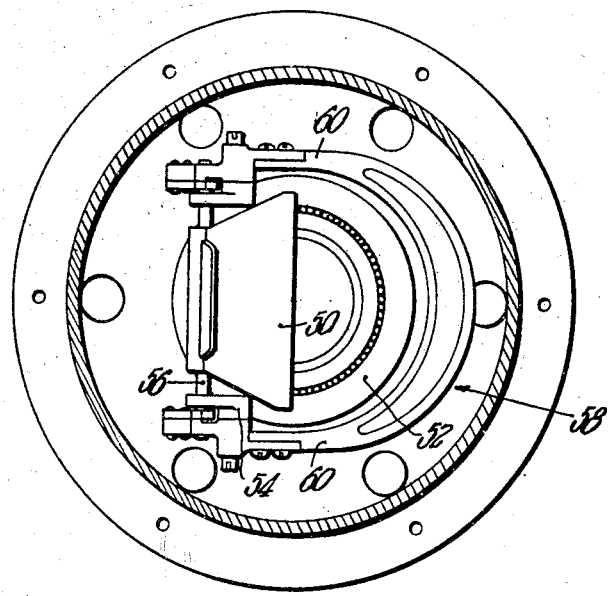
Fig. 4 is a sectional view on the line 4—4 of Fig. 3.
Figure 3:
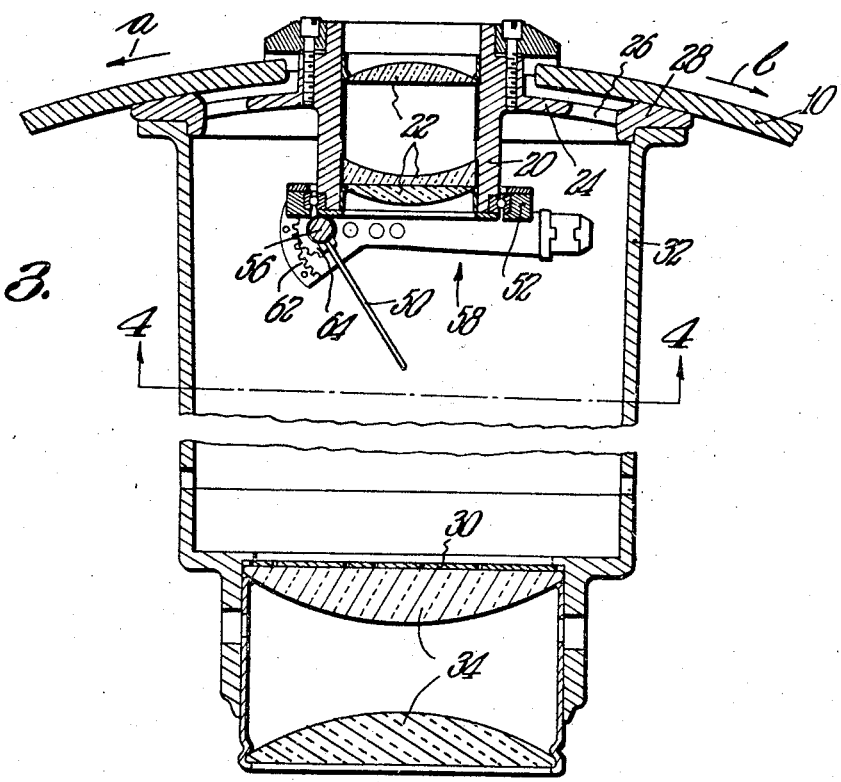
Fig. 3 is a sectional view through one of the lens of the structures associated with the hollow lens support.

There are a plurality of sources of light 12, 14 and 16 within support 10. These may take the form of lights of any desired type such as incandescent bulbs and may be of different intensities. A plurality of lens structures indicated generally by 18 associated with the lens support may include lens structures having relatively differing focal lengths, projection angles, etc., all as desired. As seen in Fig. 4, some of the lenses are arranged to project light from one source of light and others project light from other sources. Each lens structure may include lens elements such as 22, a flange 24 secured to the lens support having ventilating apertures 26, and a condensing lens or lenses associated with an outer shell or tube 32, see Fig. 3.

Also associated with the lens structures are masks or discs 30 having apertures therethrough for passing light. The focal lengths of the lens may be as desired, as may be their angles of projection and any certain lens or lenses may receive light from that light source having the desired intensity.

The masks 30 of the lens structures have such apertures therethrough as will produce on a screen spots of light of the size and intensity desired.

The lenses are arranged so that the projected areas from different lenses have parts in overlapping relation and by projecting light from sources of different intensity it is possible to provide spots of light of different intensity closely adjacent to one another, the sizes of which is controlled by the apertures in the discs.

It will be obvious that the lenses may be arranged with reference to one another and with relation to the sources of light so as to obtain the desired effects. That is, it is possible to project onto a surface or screen spots of light which have the relative disposition, size and intensity as the stars and celestial bodies seen in the sky. Since the lens support is oscillatable or rotatable on an axis which is movable, the spots of light may be projected onto and traverse a screen.

Figure 5:
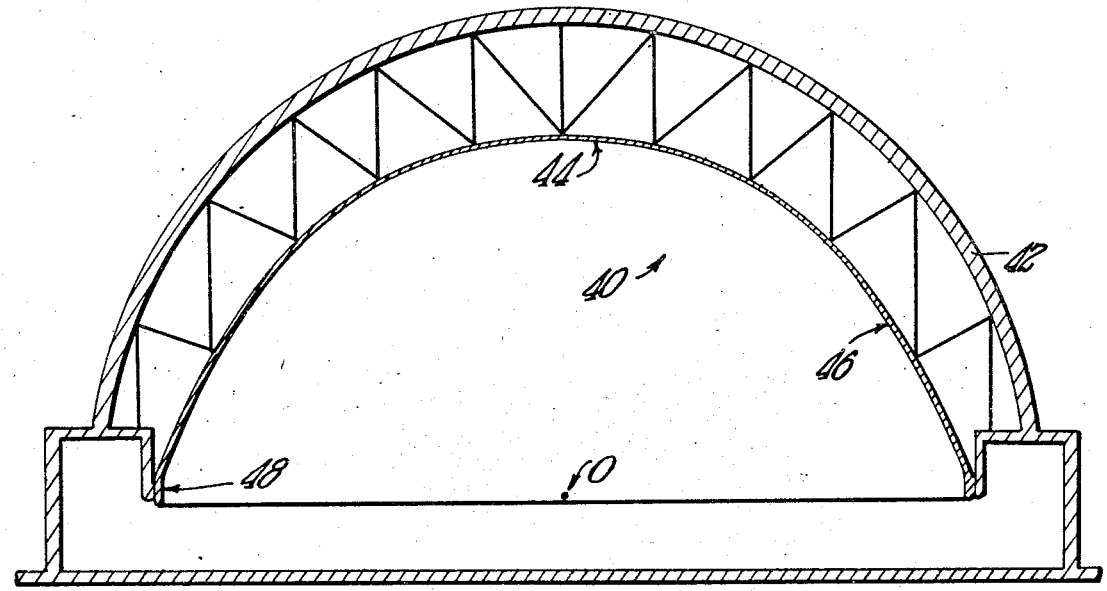
Fig. 5 is a sectional elevational view to illustrate a novel projection screen constituting part of the invention.

To produce the desired and accurate effects, as shown in Fig. 5, a screen or projecting surface 40 is provided which is generally curved in the form of an inverted dome. A roof 42 or other supporting structure supports the dome in the well-known manner.

The screen 40 has an uppermost central portion 44 which is preferably curved on a radius having a center coinciding substantially with that of the projection apparatus. The sides 46 of the screen are of a greater curvature or are made on a greater radius than that of the central portion and the sides merge into a circumferential wall portion 48 which is substantially vertically disposed as shown.

With the projection apparatus located substantially at the center O of the screen, the spots of light are projected onto the screen by the projector. In order to make the effect as realistic as possible the vertical part of the screen may be ornamented with the representation of the sky line or the like.

The projecting apparatus operates to project in the desired relative disposition, size and intensity, spots of light onto the screen, as for instance upwardly from the lower part and across and around and downwardly. The spots of light projected on the screen part having the greater curvature and especially on or near part 48 will appear to be larger than when projected onto the upper portion of the screen. This is desirable to simulate the effects as one looks at celestial bodies near the horizon. As the spots traverse this portion having the greater curvature onto that having the less curvature, the spots appear to become smaller which is the effect conceived when looking at stars.

It is desired that as the spots of light representing stars and the like travel from off the lower part of the screen that they be cut off while when moving upwardly onto the screen that the light spots become visible. To that end a shutter 50 is associated with each lens.

A ring 52 is rotatably carried by the lens tubes 20. The ring 52 has associated therewith bearing members 54 in which is rotatable a shaft 56 carrying the shutter 50. A U-shaped weight member 58 has side parts 60 which carry a gear segment 62 meshing with a gear 64 on shaft 56. As the weight swings the shutter is moved thereby. The weight 58 causes the ring 52 to rotate on the tube 20 of the lens so that the shaft 56 is at all times in a substantially horizontal plane. The shutter, as the shaft oscillates or rotates, moves towards and away from the lens.

When a lens structure is located so that its axis is in a substantially horizontal position, the shutter is in a substantially wide open position. When, however, the lens structure moves upwardly from the horizontal, the weight 58 swings clockwise so that the shutter is moved away from behind the lens. As a lens structure approaches the horizontal, the weight moves counterclockwise so that the shutter is moved into a position behind the lens. The arrangement is such that the shutters operate to close off light passing through the lenses as the axes of the lenses approach a horizontal position, while the said shutters move from behind the lenses as they move upwardly to and beyond a horizontal position. In this way spots of light are projected onto the screen only when the lenses are directed towards the screen and not onto the floor below.

Figure 6:
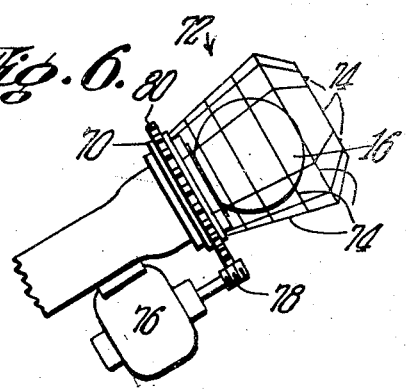
Fig. 6 is a detail elevational view of one of the light sources of the invention and showing means to bring about a twinkling effect of spots of light projected by the apparatus.

Means for causing the spots of light to twinkle to simulate a twinkling star will now be described with reference to Fig. 6.

A member 70 is rotatable on the support for the source of light 16 which carries an interrupter member indicated generally by 72. This interrupter is preferably made to have members 74 extending around the source of light at different angles so that as the interrupter 70 rotates the members thereof pass between the source of light and lenses with which the apertured discs are associated. The members in this way interrupt the light rays so that the spots of light representing stars appear to twinkle.

The interrupter may be made in different ways and take various forms and there may be one associated with each source of light. The interrupter or interrupters may be driven in various ways as by a motor 76 having a member 78 which is in mesh with a gear 80 associated with the interrupter.

P indicates mechanism for projecting spots of light representing the planetary system and S indicates mechanism for projecting spots of light representing bodies at the south pole and each may have such operating connections as may be desired.

From the foregoing it will be observed that it is possible to project spots of light simulating the stars and celestial bodies of any portion of the heavens, which are of the correct relative intensity or magnitude and relative location and size.

Also, it will be noted that as the spots are projected they may traverse the screen up around and downwardly or in any desired manner, the particular form of screen being adapted to cooperate with the projection apparatus to produce numerous desired effects.

While I have described the invention in the form at present preferred, it is not desired to be limited thereto since many changes and modifications may be made therein without departing from the spirit and scope thereof. What we desire to claim and secure by Letters Patent of the United States is:

1. In an apparatus of the class described, a rotatable lens support, a light source in said support, a lens structure in operative relation relative to said light source, a member rotatable relative to said lens structure on the axis thereof, a shutter pivoted to said member for swinging movements, a weight means for rotating said member and swinging said shutter, all adapted and arranged in cooperative relationship whereby said weight means rotates said rotatable member and swings said shutter into a certain position between said source of light and said lens structure when the axis of the same is in a certain position and said weight means rotates said member and swings said shutter away from said certain position when the axis of the lens is in a different position.

2. In an apparatus of the class described, a rotatable lens support, a light source in said support, a lens structure in operative relation relative to said light source, a member rotatable relative to said lens structure on the axis thereof, a shutter pivoted to said member for swinging movements between a closed position between said lens structure and said light source and an open position away therefrom, an actuating weight operatively connected to said shutter, all adapted and arranged in cooperative relationship whereby the said movable member is rotated so that the said shutter is in open position when the said lens structure is carried to a position where its axis is in a certain plane while the said shutter is in closed position when the said lens structure is carried to another position where the axis thereof is in another plane relative to said first-named plane.

3. In an apparatus of the class described comprising in combination, a lens support rotatable on certain axes, a plurality of light sources in said support, a concave spherical screen, a plurality of projecting elements, each said projector element comprising a condenser, an objective lens having a mount, a stencil positioned between the condenser and said lens, a supporting ring rotatably mounted on the objective mount on an axis substantially parallel to the optical axis thereof, a weighted yolk means pivoted on an axis disposed at one side of said ring, and a shutter means for said objective pivotally operable on said yolk by gravity, all adapted and arranged in cooperative relationship so that when the axis of said objective is moved relative to said yolk in one direction the said yolk rotates to a rest position, the said shutter being operated to move across the projection beam as said axis is moved toward a horizontal position to cut off the projected points of light as they near the horizon.

4. A projection apparatus comprising in combination, a support, a carriage movable on said support, a light housing rotatably mounted on said carriage, a light source disposed within said light housing, and a plurality of lens projector systems associated with said light housing and each positioned relative to said light source to project light beams therefrom onto a certain portion of a surface, each of said lens projector systems including a condensing lens in operative relationship with said light source and an objective lens disposed axially relative to said condensing lens with a mask between said lenses having apertures for the passage of light beams therethrough and a shutter means movable with said light housing consisting of a member rotatable relative to said lenses and a shutter pivoted to the member for swinging movements and a weight means for rotating the member and swinging the shutter, all adapted and arranged in co-operative relationship whereby as said housing rotates on said carriage or as said carriage moves on said support light beams may be projected onto a surface except when said shutter means are positioned to cut off the light beams.

5. A projection apparatus comprising in combination, a support, a carriage movable on said support, a light housing rotatably mounted on said carriage, a plurality of sources of light of different intensities within said light housing, and a plurality of lens projector systems associated with said light housing, each of said lens projector systems being positioned generally radially relative to one of said light sources to project light beams therefrom onto a certain portion of a surface with other of said lens projector systems disposed in operative relation with other of said light sources, each of said lens projector systems including a condensing lens in operative relationship with one of said light sources and an objective lens disposed axially relative to said condensing lens with an apertured mask located between said lenses for the passage of light beams therethrough and a shutter device movable with said housing consisting of a member rotatable relative to said lens projector system and a shutter pivoted to the member for swinging movements and a weight means for rotating the member and swinging the shutter, all adapted and arranged in co-operative relationship whereby as said housing rotates on said carriage or as said carriage moves on said support light beams may be projected onto a surface except when said shutter means are positioned to cut off the light beams.

6. A projector system of the class described comprising in combination, a support, a carriage movable on said support, a light housing rotatably mounted on said carriage, a plurality of light sources within said housing, a plurality of lens projector systems on said housing positioned generally radially relative to said light sources to project light therefrom onto a surface, each of said systems including a condensing lens in operative relationship with said light sources and an objective lens disposed axially relative to said condensing lens and an apertured mask located between said lenses, and a shutter device associated with each of said lens projector systems movable with said housing including, a member rotatable relative to said lens projector system on the axis thereof and a shutter pivoted to said member on an axis disposed so as to permit swinging thereof between a position intermediate the projector lens system with which said device is associated and the light source therefor and a position away therefrom and provided with a weight means disposed eccentrically relative to said axis for rotating said member and swinging said shutter.

7. A projection apparatus comprising in combination, a support, a carriage movable on said support, a light housing rotatably mounted on said carriage, a light source within said housing, a projector lens system on said housing for projecting light from said source including a condenser lens and an objective lens with an apertured mask therebetween whereby spots of light may be projected onto a surface to simulate stars, and a movable interrupting means associated around said light source having members spaced apart to permit the passage of light therebetween and the members themselves preventing the passage of light therethrough, all adapted and arranged in cooperative relationship whereby said interrupting means produces variations in light beams from said light source to give the effect of twinkling stars.

8. A projection apparatus comprising in combination, a support, a carriage movable on said support, a light housing rotatably mounted on said carriage, a plurality of light sources within said housing, a projector lens system on said housing for projecting light from said sources including a condenser lens and an objective lens with an apertured mask therebetween whereby spots of light may be projected onto a surface to simulate stars, and a rotatable interrupting means associated around said light sources having members spaced apart to permit the passage of light therebetween and the members themselves preventing the passage of light therethrough, all adapted and arranged in co-operative relationship whereby said interrupting means produces variations in light beams from said light source to cause the light spots to appear as twinkling stars.

FRANK D. KORKOSZ.
JOHN J. KORKOSZ.